(12) United States Patent
Sheng

(10) Patent No.: US 12,730,757 B2
(45) Date of Patent: Sep. 8, 2026

(54) EFFICIENT INPUT/OUTPUT MEMORY MANAGEMENT UNIT

(71) Applicant: Advanced Micro Devices, Inc., Santa Clara, CA (US)

(72) Inventor: Wei Sheng, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 277 days.

(21) Appl. No.: 18/116,543

(22) Filed: Mar. 2, 2023

(65) Prior Publication Data

US 2024/0296128 A1 Sep. 5, 2024

(51) Int. Cl.

*G06F 12/1027* (2016.01)
*G06F 12/02* (2006.01)
*G06F 13/16* (2006.01)

(52) U.S. Cl.

CPC ...... *G06F 12/1027* (2013.01); *G06F 12/0292* (2013.01); *G06F 13/1626* (2013.01)

(58) Field of Classification Search

CPC ............. G06F 12/1027; G06F 12/0292; G06F 13/1626

USPC ........................................................ 711/206

See application file for complete search history.

(56) References Cited

U.S. PATENT DOCUMENTS

| | | | | |
|---|---|---|---|---|
| 7,917,726 | B2 | 3/2011 | Hummel et al. | |
| 2014/0075123 | A1* | 3/2014 | Hildesheim | G06F 12/1027 711/E12.07 |
| 2017/0123693 | A1 | 5/2017 | Kegel | |
| 2018/0018105 | A1* | 1/2018 | Magro | G11C 7/1072 |
| 2019/0384722 | A1* | 12/2019 | Basu | G06F 11/3471 |
| 2020/0264783 | A1* | 8/2020 | Patel | G06F 3/0619 |

* cited by examiner

*Primary Examiner* — Jared I Rutz
*Assistant Examiner* — Wei Ma
(74) *Attorney, Agent, or Firm* — Polansky & Associates, P.L.L.C.; Paul J. Polansky

(57) ABSTRACT

An input/output memory management unit includes a control logic circuit and a device table entry valid bit array. The control logic circuit provides physical addresses in response to virtual addresses of memory access requests from a plurality of input/output devices. The device table entry valid bit array stores a plurality of valid bits corresponding to different ones of the plurality of input/output devices. The control logic circuit accesses a first valid bit corresponding to a first input/output device from the device table entry valid bit array, and selectively accesses a device table in a system memory in response to a state of the valid bit.

21 Claims, 5 Drawing Sheets

EFFICIENT INPUT/OUTPUT MEMORY MANAGEMENT UNIT

FIELD

This disclosure relates generally to data processing systems, and more specifically to input/output memory management units and data processing systems using them.

BACKGROUND

Some computer systems use a table to keep a list of peripherals that require direct memory access (DMA) address remapping or interrupt remapping. These peripherals may include, for example, a communication controller, a bus bridge, an analog-to-digital or digital-to-analog converter, a graphics processor, a display processor, various human interface devices, and the like. This table is known as the "Device Table," and it includes information useful for interacting with the input/output peripheral devices. In some computing systems, system software executing on a central processing unit creates and maintains the Device Table, while an input-output memory management unit (IOMMU) maintains the Device Table to manage interactions with these peripheral devices. In such computing devices, the IOMMU may use information from or based on the Device Table to handle transactions for peripheral devices, including interrupts from/associated with the peripheral devices, address translations for addresses in requests from peripheral devices, and other operations. The Device Table is stored in main or "system" memory and includes entries that store device information for the peripheral devices used in the system.

In order to be compatible with certain peripheral address formats, such as the popular Peripheral Component Interconnect Express ("PCIe") bus using 16-bit device identifiers (DeviceIDs), the Device Table has a correspondingly large set of entries in the device table, each of which stores a large number of bits. For example, the Device Table may require two megabytes (MB) of system memory. Although the Device Table is large, it is likely to be sparsely populated in most systems.

When a peripheral device attempts to read or write to system memory, the IOMMU first determines whether an entry is valid using a valid bit in the Device Table entry. Since the valid bit is set and cleared by system software, the input/output memory management unit accesses it from the Device Table unless it has already been cached in a translation lookaside buffer (TLB) entry. If valid bit indicates that the entry is valid, the input/output memory management unit then performs the address translation and privilege checking, and stores the translation information in the translation lookaside buffer. If the entry is not valid, the input/output memory management unit passes the virtual address through without translation and without performing privilege checking.

Figure 1:
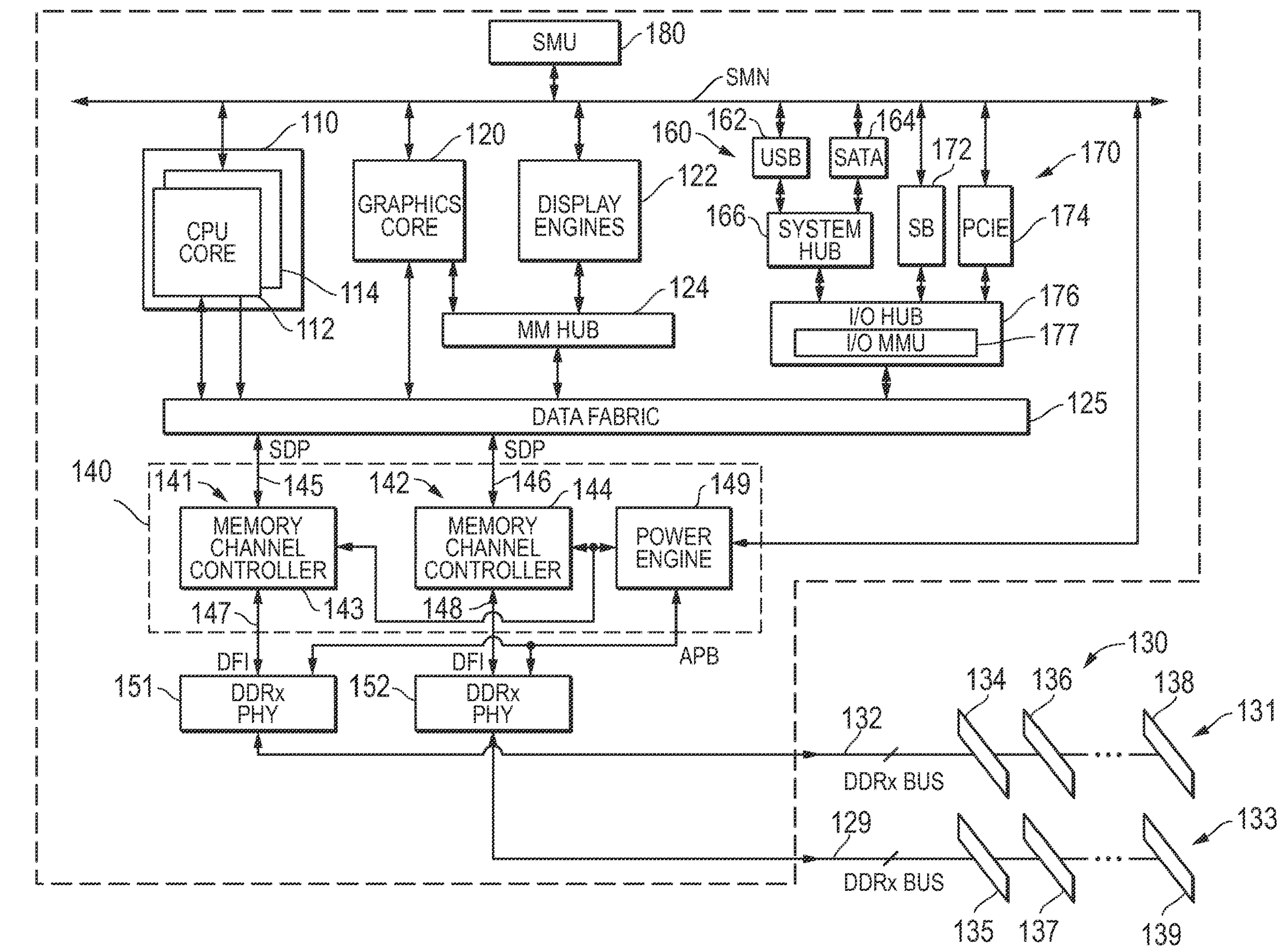
FIG. 1 illustrates in block diagram form a data processing system having an input/output memory management unit according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

An input/output memory management unit includes a control logic circuit and a device table entry valid bit array. The control logic circuit provides physical addresses in response to virtual addresses of memory access requests from a plurality of input/output devices. The device table entry valid bit array stores a plurality of valid bits corresponding to different ones of the plurality of input/output devices. The control logic circuit accesses a first valid bit corresponding to a first input/output device from the device table entry valid bit array, and selectively accesses a device table in a system memory in response to a state of the valid bit.

A data processing system includes a plurality of input/output devices, an input/output memory management unit, a data fabric, and a memory controller. Each of the plurality of input/output devices generates memory access requests for a system memory. The input/output memory management unit translates virtual addresses of the memory access requests into physical addresses. The data fabric selectively routes the physical addresses to a plurality of ports thereof. The memory controller has a first port coupled to a first port of the data fabric, and a second port adapted to be coupled to the system memory. The input/output memory management unit includes a device table entry valid bit array for storing a plurality of valid bits corresponding to different ones of the plurality of input/output devices. The input/output memory management unit accesses a first valid bit corresponding to a first input/output device from the device table entry valid bit array, and selectively accesses a device table in the system memory in response to a state of the first valid bit.

A method includes of input/output device memory management includes receiving a virtual address from a first input/output device. A first valid bit corresponding to the first input/output device in a device table entry valid bit array in an input/output memory management unit is checked. If the first valid bit has a first state, a physical address is provided to a system memory without translating the virtual address. If the first valid bit has a second state, a device table entry of a device table in the system memory is accessed, and the virtual address is translated to the physical address according to information in the device table entry.

FIG. 1 illustrates in block diagram form an accelerated processing unit (APU) 100 and memory system 130 in which a memory controller as described herein may be used according to some embodiments. APU 100 is an integrated circuit suitable for use as a processor in a host data processing system, and includes generally a central processing unit (CPU) core complex 110, a graphics core 120, a set of display engines 122, a multimedia hub 124, a data fabric 125, a memory controller 140, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include any number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high-performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common multimedia hub 124 for uniform translation into appropriate addresses in memory system 130, and multimedia hub 124 is bidirectionally connected to data fabric 125 for generating such memory accesses and receiving read data returned from the memory system.

Data fabric 125 includes a crossbar switch for routing memory access requests and memory responses between any memory accessing agent and memory controller 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus, for example, a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory controller 140 and its associated physical interface circuits (PHYs) 151 and 152 are integrated with APU 100 in this embodiment. Each of physical interface circuits 151 and 152 is labelled "DDRx PHY" to indicate that they are capable of connecting to one or more double data rate memory types. Memory controller 140 includes memory channel controllers 141 and 142 and a power engine 149. Memory channel controller 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to physical interface circuit 151, and in the exemplary embodiment conforms to the DDR PHY Interface (DFI) Specification. Memory channel controller 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to physical interface circuit 152, and conforms to the DFI Specification. Power engine 149 is bidirectionally connected to SMU 180 over the SMN bus, to physical interface circuits 151 and 152 over the APB, and is also bidirectionally connected to memory channel controllers 143 and 144. PHY 151 has a bidirectional connection to memory channel 131. PHY 152 has a bidirectional connection to memory channel 133.

Memory controller 140 is an instantiation of a memory controller having two memory channel controllers and uses a shared power engine 149 to control operation of both memory channel controller 143 and memory channel controller 144 in a manner that will be described further below. Each of memory channel controllers 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDR bus 132, including representative DIMMs 134, 136, and 138 that in this example correspond to separate ranks. Likewise, memory channel 133 includes a set of DIMMs connected to a DDR bus 129, including representative DIMMs 135, 137, and 139.

APU 100 operates as the central processing unit (CPU) of a host data processing system and provides various buses and interfaces useful in modern computer systems. These interfaces include two double data rate memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
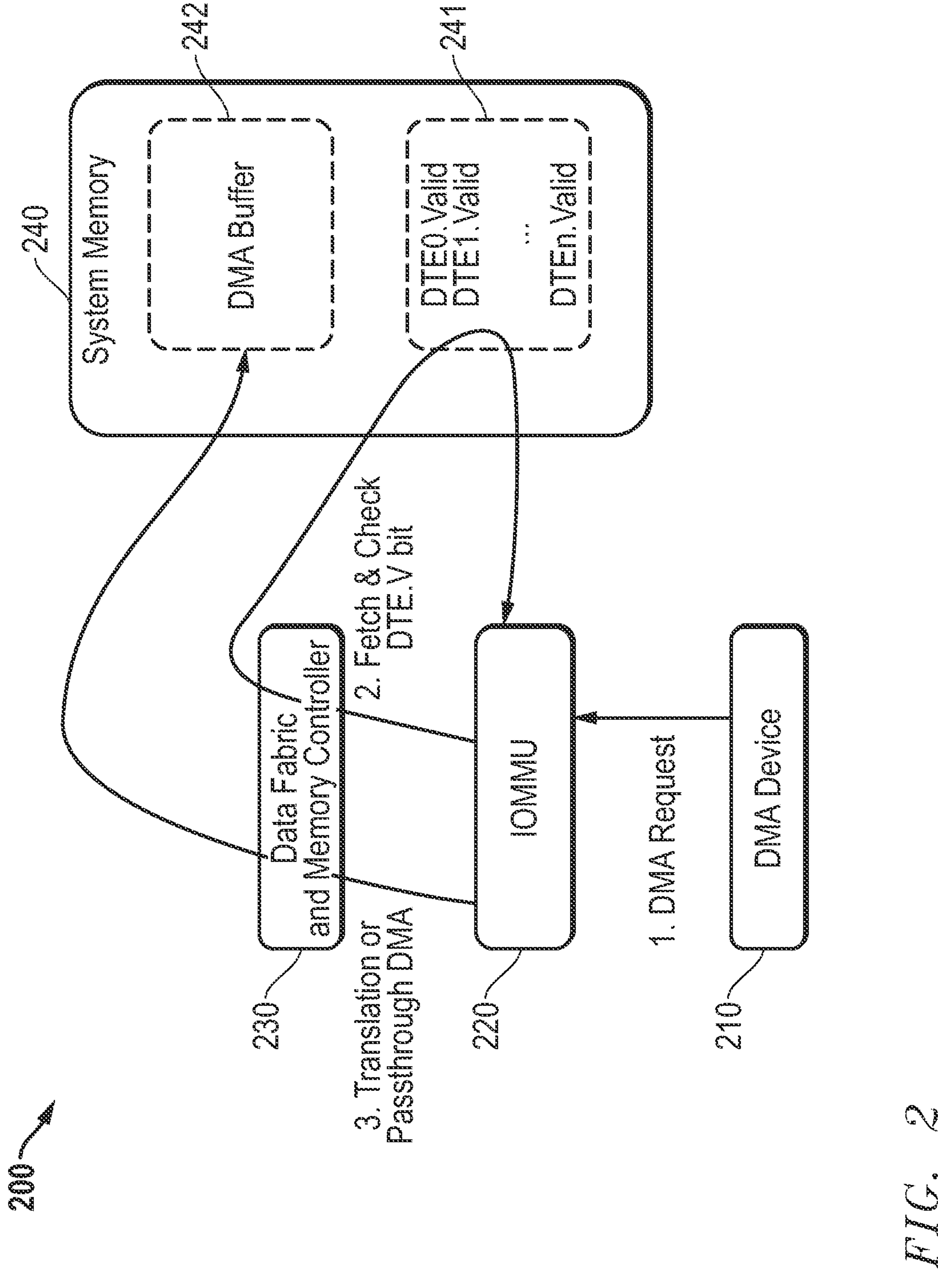
FIG. 2 illustrates in block diagram form a data processing system having an input/output memory management unit according to the prior art.

FIG. 2 illustrates in block diagram form a data processing system 200 having an input/output memory management unit 220 according to the prior art. Data processing system 200 includes a peripheral having an associated direct memory access device 210 labelled "DMA device", an input/output memory management unit 220 labelled "IOMMU", a data fabric and a memory controller 230, and a system memory 240.

Direct memory access device 210 provides read and write access requests to store received data into a buffer in system memory 240 and to fetch data from system memory 240 from and to an associated peripheral device, respectively. The associated peripheral device can be any number of peripheral circuits such as a communication controller, a bus bridge, an analog-to-digital or digital-to-analog converter, a graphics processor, a display processor, one of a variety of human interface devices, and the like. Direct memory access device 210 initiates an input/output memory management event labelled "1. DMA Request" by sending a read or write memory access request to input/output memory management unit 220.

Input/output memory management unit 220 maps virtual addresses received as part of memory access requests from the peripherals provided by direct memory access device 210, to corresponding physical addresses in system memory 240, while enforcing access permissions such as read-only and the like. To provide a high level of flexibility and support for different end user configurations, data processing system 200 is configurable to support a large number of peripheral devices. For example, data processing system can support $2^{16}$=65,536 different input/output devices, and data processing system 200 can be configured to work with any number of peripherals in that range. In response to receiving the DMA request, input/output memory management unit 220 issues a memory read to see if the device requires address remapping or interrupt remapping as indicated by an entry in the device table having a valid bit set, and if so, to see what the attributes of the region are.

Data fabric and memory controller 230 correspond to data fabric 125 and memory controller 140, respectively, of FIG. 1. In a complicated data processor such as an accelerated processing unit or a highly integrated system on chip (SoC), the on-chip data fabric routes memory access requests from a variety of agents to a set of resources including DRAM memory controllers. Because of the high-performance and parallel architecture of this system, the data fabric will typically include buffers for each upstream (away from the memory) and downstream (toward the memory) port, as well as a large crossbar switch to switch memory access requests and data between any upstream port and any downstream port. In order to account for interfering data flows, the crossbar switch includes an arbiter to determine which access is able to pass through the crossbar switch. In response to input/output memory management unit 220 issuing the "2. Fetch and check DTE. V bit access", the data fabric receives it, buffers it, and switches it to an appropriate downstream port when selected by its internal arbiter.

The memory controller is a controller that issues memory-friendly commands to system memory 240 in response to general or "canonical" memory access commands. In a common implementation, system memory 240 is made up of double data rate synchronous dynamic random access memories that support asymmetric accesses. The accesses are asymmetric in the sense that certain types of accesses take less time than other types of accesses. One example is an access to an open page compared to an access to a closed page. A dynamic random access memory has multiple memory banks, each including rows whose contents are first loaded into a page buffer using a "row activate" command. Once loaded into the page buffer, the memory locations in the activated row can be accessed very quickly because they don't cause the memory array to be accessed, only the page buffer. Another example is accesses to a current memory access type, e.g., either read or write. While the memory controller is performing accesses of one type, switching to accesses of the other type will slow bus operation to accommodate a bus "turnaround". Because of these asymmetries, the dynamic random access memory controller scans a local storage of pending memory access requests, sometimes referred to as a command queue, and picks memory access requests that utilize the memory bus most efficiently out-of-order. While this feature of the memory controller improves system bus utilization efficiency, it adds latency to other pending commands.

When the memory access request that is generated in response to the DMA request has progressed through the data fabric and memory controller, the memory controller issues the memory access command to DMA buffer 242 in system memory 240. For example, in the case of a read memory access request that reads the Device Table, the memory controller passes the Device Table entry upstream through the data fabric and eventually to input/output memory management unit 220.

Input/output memory management unit 220 then determines whether the device table entry is valid by examining the state of the DTE valid bit, e.g., DTE0. Valid as shown in FIG. 2. It does so by reading the device table entry in device table 241 that corresponds to the virtual address of the memory access request.

If the DTE valid bit is in a first state, e.g., a binary "1", then then the entry is valid and input/output memory management unit 220 uses the information in the rest of the Device Table entry, fetched when it fetched the valid bit, to check for access violations. If there are no access violations, then input/output memory management unit 220 issues a translated address to access the data indicated by the DMA Request in DMA buffer 242.

If the DTE valid bit is in a second state, e.g., a binary "0", them then the entry is invalid. Input/output memory management unit 220 passes the address of the memory access request through to system memory 240 without alteration and without checking privileges. Thus, input/output memory management unit 220 issues a memory access request to selectively access the DMA buffer using a transaction labelled "3. Translation or Passthrough DMA".

Data processing system 200 requires a large number of clock cycles before input/output memory management unit 220 can determine whether the DMA Request is for a device that has a valid entry in device table 241. In one example, input/output memory management unit 220 reads an entire device table entry in a single burst cycle. For example, if each device table entry is 256 bits and system memory by-32 (×32) memory, then the entire Device Table entry can be accessed in a single, 8-cycle burst. Device table entry accesses require a significant amount of delay, even in cases in which the device table entry is invalid.

Figure 3:
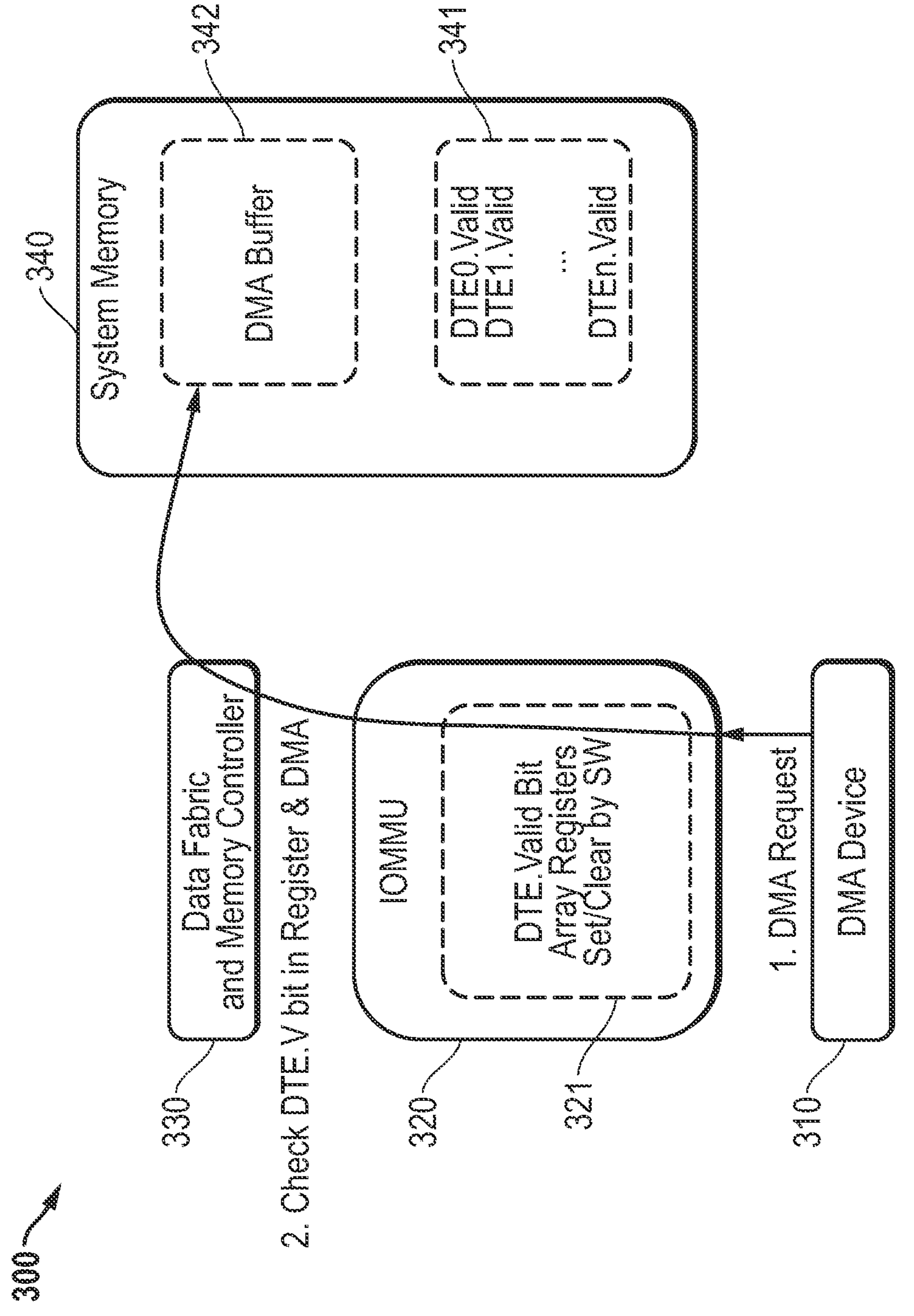
FIG. 3 illustrates in block diagram form a data processing system having an input/output memory management unit according to some embodiments.

FIG. 3 illustrates in block diagram form a data processing system 300 having an input/output memory management unit 320 according to some embodiments. Data processing system 300 includes an input/output peripheral having an associated direct memory access device 310 labelled "DMA Device", an input/output memory management unit 320 labelled "IOMMU", a data fabric and a memory controller 330, and a system memory 340.

Direct memory access device 310 is an electrical circuit that provides read access requests to fetch data from a buffer in system memory 340 and provide it to an associated peripheral device, and/or write access requests to store data into system memory 340 from an associated peripheral device. The associated peripheral device can be any number of peripheral circuits such as a communication controller, a bus bridge, an analog-to-digital or digital-to-analog converter, a graphics processor, a display processor, one of a variety of human interface devices, and the like. Direct memory access device 310 initiates an input/output memory management event labelled "1. DMA Request" by sending a read or write memory access request to input/output memory management unit 320.

Input/output memory management unit 320 is an electrical circuit that maps virtual addresses received as part of the memory access requests from the peripherals provided by direct memory access device 310, to corresponding physical addresses in system memory 340, while enforcing access permissions such as read-only and the like. To provide a high level of flexibility and support for different end user configurations, data processing system 300 is configurable to support a large number of peripheral devices. In the example shown in FIG. 3, data processing system 300 supports $2^{16}$=65,536 different input/output devices, and can be configured to work with any number of peripherals up to 65,536.

Unlike input/output memory management unit 220 of FIG. 2, however, input/output memory management unit 320 has a local memory 321 to store the Device Table entry valid bits. A software entity such as an operating system, a hypervisor, or a device driver writes Device Table entry valid bits in local memory 321, and all fields including valid bits in Device Table 341 for all input/output peripherals present in data processing system 300.

Data fabric and memory controller 330 are electrical circuits that operate as described above for data fabric 125 and memory controller 140 of FIG. 1. In response to a DMA request, input/output memory management unit 320 first accesses local memory 321 to determine whether the device is present as indicated by the corresponding entry in Device Table 341 having a valid bit set. Because the valid bit is also stored in local memory 321, input/output memory management unit 320 can quickly determine whether a fetch to Device Table 341 is required.

Input/output memory management unit 320 provides better efficiency compared to input/output memory management unit 220 of FIG. 2. It accesses the valid bit very quickly from local memory 321, without the long latency required for accessing system memory 340 as described with respect to data processing system 200 of FIG. 2. If the valid bit for the corresponding device table entry in in the cleared state, e.g., binary "0", input/output memory management unit 320 suppresses any access to Device Table 341, and instead issues a corresponding memory access request as a pass-through address, without address translation or privilege checking.

In a complicated data processor such as an accelerated processing unit or a highly integrated system on chip (SoC), the on-chip data fabric routes memory access requests from a variety of agents to a set of resources including DRAM memory controllers. Because of the high complexity of the system, the data fabric typically includes buffers for each upstream port (away from system memory 340) and downstream port (toward system memory 340), as well as a large crossbar switch to switch memory access requests and data between any upstream port and any downstream port. In order to account for interfering data flows, the crossbar switch includes an arbiter to determine which access is able to pass through the crossbar switch.

In response to receiving the memory access request to direct memory access buffer 342 of the "2. Check DTE. V bit in Register and DMA", memory management unit 320 issues a memory access request to an upstream port of the data fabric. The data fabric receives it, buffers it, and routes it to an appropriate downstream port connected to the memory controller when selected by its internal arbiter. The memory controller issues memory-friendly commands to system memory 340 in response to memory access requests to direct memory access buffer 342. As before, the memory controller scans a local storage of memory access requests, e.g., a command queue, and picks the memory access requests that do not result in decreased efficiency, subject to certain rules that preserve fairness for other requesting entities.

When the memory access request that is generated in response to the DMA request has progressed through the data fabric and memory controller, the memory controller issues the instruction to system memory 340 as a read or write command. When a read command is complete, the memory controller passes the accessed data upstream through the data fabric and eventually to direct memory access device 310.

Thus, input/output memory management unit 320 improves system performance and efficiency by using Device Table entry valid bit array 321 and suppressing accesses to Device Table 341 when the access would indicate an invalid entry.

Figure 4:
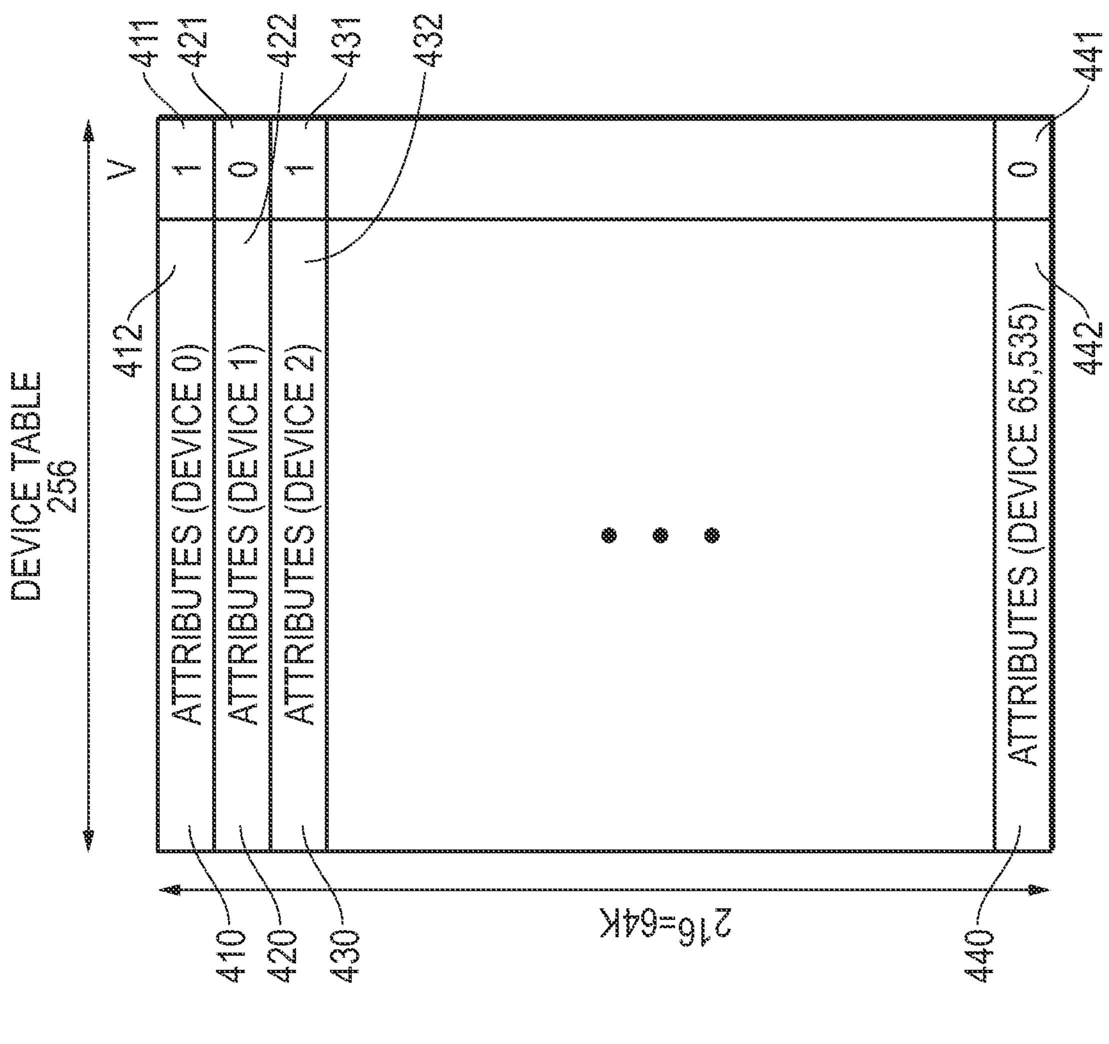
FIG. 4 illustrates a device table that can be used as the device table of FIG. 3 according to some embodiments.

FIG. 4 illustrates a device table 400 that can be used as Device Table 341 of FIG. 3 according to some embodiments. Device table 400 is located in system memory and includes a number of entries. In the example shown in FIG. 4, each device table entry is 256 bits in length, which allows each table entry to be accessed in a single, 8-cycle burst access if system memory 340 is a by-32 (×32) memory. In addition, device table 400 uses 16 address bits to select an entry, providing $2^{16}$=65,536 entries. Using 16 address bits allows the peripheral to be mapped using device identifiers ("DeviceIDs") of a peripheral component interconnect express (PCIe) bus or a peripheral component interconnect extended ("PCI-X") bus, in which bits 15:8 specify the bus, buts 7:3 specify the device, and bits 2:0 specify the function.

Each device table entry has a valid bit labelled "V" in a least-significant bit position, and a set of attributes in the more-significant bit positions. As shown in FIG. 4, device table 400 includes a first entry 410 for a device labelled "DEVICE 0" having a valid bit 411 and an attributes bit field 412, a second entry 420 for a device labelled "DEVICE 1" having a valid bit 421 and an attributes bit field 422, a third entry 430 for a device labelled "DEVICE 3" having a valid bit 431 and an attributes bit field 432, and a last entry 440 for a device labelled "DEVICE 65,535" having a valid bit 441 and an attributes bit field 442. Examples of attributes include whether the page translation information is valid; whether interrupt information is valid; interrupt control fields; mode bits; page table root pointers for page table walking to determine translations; device identifiers including guest identifiers in systems that support virtualization; and snoop attributes. It should be apparent that this list is only exemplary, and may vary between embodiments. For example, various data processing systems support different page sizes, which will affect page table walking descriptor lengths.

Exemplary IOMMU Implementation

Figure 5:
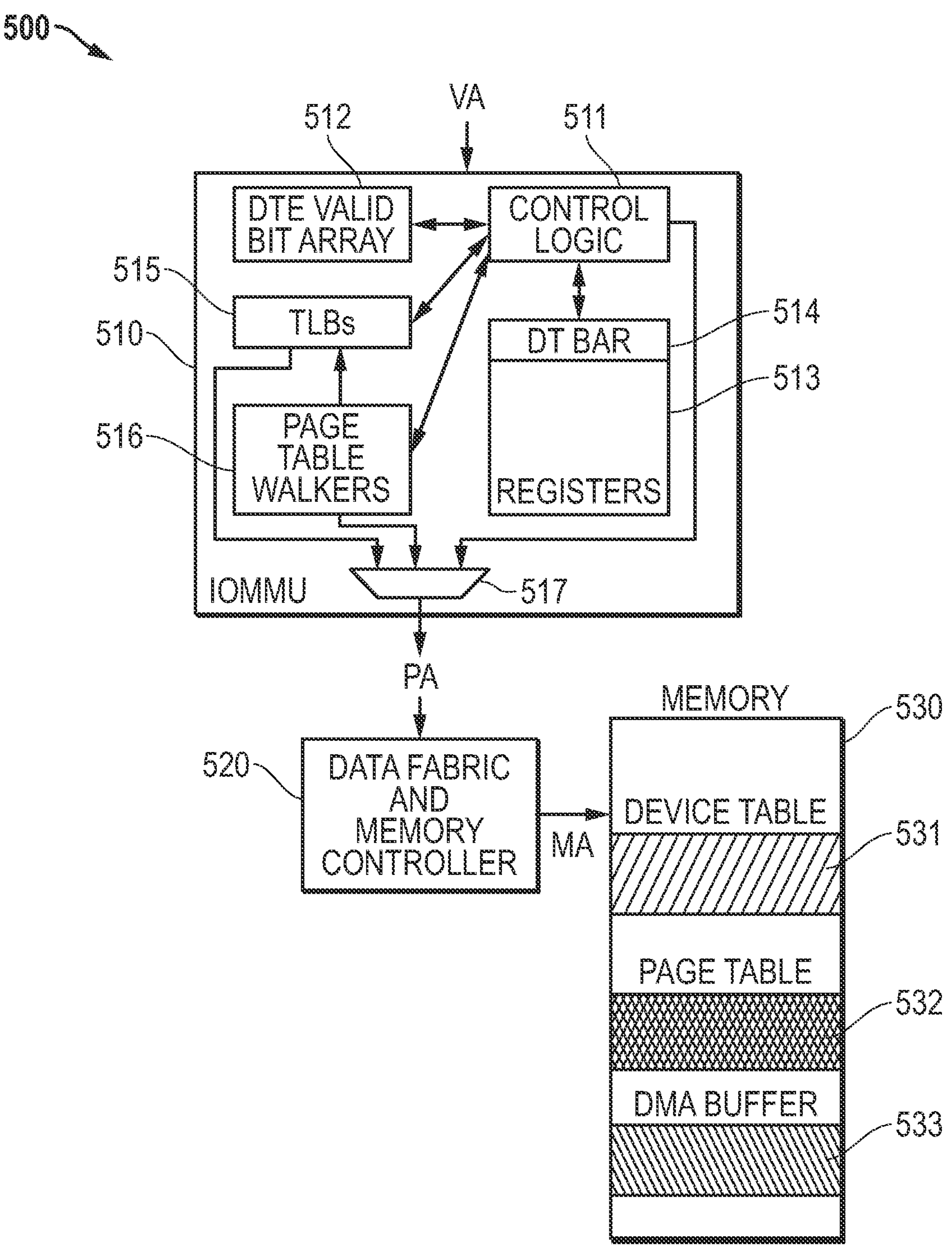
FIG. 5 illustrates a portion of a data processing system have an input/output memory management unit according to some embodiments.

FIG. 5 illustrates a portion of a data processing system 500 having an input/output memory management unit 510 according to some embodiments. Data processing system 500 includes generally input/output memory management unit 510, a data fabric and memory controller 520, and a system memory 530, as well as other components that were described with respect to FIG. 1 but will not discussed further here.

Input/output memory management unit 510 has an input for receiving a virtual address labelled "VA" and an output for providing a physical address labelled "PA". Input/output memory management unit 510 includes generally a control logic circuit 511 labelled "CONTROL LOGIC", a device table entry valid bit array 512 labelled "DTE VALID BIT ARRAY", a set of control registers 513 labelled "REGISTERS" including a device table base address register 514 labelled "DT BAR", a set of translation look-aside buffers 515 labelled "TLBs", a set of page table walkers 516 labelled "PAGE TABLE WALKERS", and an output selector 517. Data fabric and memory controller 520 has an input for receiving the physical address from input/output memory management unit 510, and an output for providing a memory address labelled "MA". System memory 530 has an input for receiving the memory address, and an input/output port for providing data in response to a read command over a data bus (not shown), or receiving data in response to a write command over the data bus. System memory 530 has three regions of interest, including a device table 531, a page table 532, and a direct memory access buffer 533 labelled "DMA BUFFER".

Control logic circuit 511 controls the operations of the other circuits in input/output memory management unit 510. In response to receiving a virtual address labelled "VA", control logic circuit 511 first reads the corresponding valid bit in device table entry valid bit array 512 using a 16-bit portion of the request identifier (ID), e.g., a portion of a PCIe transaction layer packet as an index into it. Device table entry valid bit array 512 is implemented with high-speed static random access memory (SRAM) and is accessible by control logic circuit 511 at high speed.

If the corresponding valid bit is in a first logic state indicating a valid state, e.g., a binary "1", and control logic circuit 511 determines that a valid translation is cached in translation look-aside buffers 515. Control logic circuit 511 uses the translation information in the Device Table entry to create a physical address. It provides the physical address to an input of selector 517, and causes selector 517 to output the selected physical address as the PA signal.

If the corresponding valid bit indicates the valid state and control logic circuit 511 determines that a valid translation is not cached in translation look-aside buffers 515, then control logic circuit 511 first fetches the Device Table entry from device table 531 of system memory 530 through data fabric and memory controller 520. Based on various attributes in the corresponding Device Table entry, such as the page table root pointer, control logic circuit 511 causes a page table walker of page table walkers 516 to walk the page tables stored in page table 532 to create the translation. Each page table walker of page table walkers 516 is a semi-autonomous state machine that automatically generates addresses to access the indicated page table in page tables 532 to fetch and construct the translation. After the selected page table walker creates the translation, control logic circuit 511 stores the translation in translation look-aside buffers 515 for future reference, and replaces an older translation lookaside buffer entry such as one that is least recently used. Control logic circuit 511 then causes the page table walker to output the translation through selector 517 as the indicated PA for accessing direct memory access buffer 533.

If the corresponding valid bit indicates the invalid state, then control logic circuit 511 passes the virtual address through as the physical address without performing any address translation or privilege checking. In this case, control logic circuit 511 provides the virtual address as the physical address and without accessing device table 531.

In this way, input/output memory management unit 510 avoids accessing device table 531 when either the device table entry valid bit is inactive, or when the device table entry is active but the translation has already been stored in a translation lookaside buffer. It is believed that the improved efficiency of the data bus will outweigh the extra integrated circuit area for the device table entry valid bit array 512 in many or most complex systems architectures.

While particular embodiments have been described, various modifications to these embodiments will be apparent to those skilled in the art. For example, either a logic "1" state or a logic "0" state can be used to indicate an active device table entry. The input/output memory management unit can operate with various numbers of translation lookaside buffers and page table walkers. The page size, and hence the number of tables that need to be accessed to create a translation, can vary between different embodiments. The number of bits in a device table entry may also vary in different embodiments. The input/output memory management unit can be dedicated to only input/output peripherals, or can be associated with one or more processing units associated with input/output functions, such as display controllers and graphics processing units, or both.

Accordingly, it is intended by the appended claims to cover all modifications of the disclosed embodiments that fall within the scope of the disclosed embodiments.

What is claimed is:

1. An input/output memory management unit, comprising:

a control logic circuit for providing physical addresses in response to virtual addresses of memory access requests from a plurality of input/output devices; and a device table entry valid bit array for storing a plurality of valid bits corresponding to different ones of said plurality of input/output devices, wherein said control logic circuit accesses a first valid bit corresponding to a first input/output device from the device table entry valid bit array, and selectively accesses a device table in a system memory in response to a state of the first valid bit, and wherein the input/output memory management unit is implemented as an integrated circuit.

2. The input/output memory management unit of claim 1, wherein:

the input/output memory management unit provides a first virtual address as a first physical address in response to a first state of the first valid bit of without accessing the device table in the system memory.

3. The input/output memory management unit of claim 1, wherein:

the input/output memory management unit translates a first virtual address into a first physical address in response to a second state of the first valid bit.

4. The input/output memory management unit of claim 3, wherein:

the input/output memory management unit selectively accesses the device table in the system memory in response to the second state of the first valid bit.

5. The input/output memory management unit of claim 4, wherein:

the input/output memory management unit further comprises a translation look-aside buffer; and the input/output memory management unit uses a translation in the translation look-aside buffer if a valid translation exists for the first virtual address in the translation look-aside buffer.

6. The input/output memory management unit of claim 5, wherein:

the input/output memory management unit walks a page table in the system memory if no valid translation exists for the first virtual address in the translation look-aside buffer.

7. The input/output memory management unit of claim 6, wherein:

the input/output memory management unit further comprises a page table walker; and the input/output memory management unit uses the page table walker to form a translation of the first virtual address into the first physical address, and subsequently stores the translation in the translation look-aside buffer.

8. The input/output memory management unit of claim 7, further comprising:

the page table walker is one of a plurality of page table walkers, wherein multiple ones of the plurality of page table walkers are able to be active at the same time.

9. A data processing system comprising:

a plurality of input/output devices, each generating memory access requests for a system memory;

an input/output memory management unit that translates virtual addresses of the memory access requests into physical addresses;

a data fabric for selectively routing the physical addresses to a plurality of ports thereof; and a memory controller having a first port coupled to a first downstream port of the data fabric, and a second port adapted to be coupled to the system memory, wherein the input/output memory management unit comprises a device table entry valid bit array for storing a plurality of valid bits corresponding to different ones of said plurality of input/output devices, wherein said input/output memory management unit accesses a first valid bit corresponding to a first input/output device from the device table entry valid bit array, and selectively accesses a device table in the system memory in response to a state of the first valid bit and, wherein the input/output memory management unit is implemented as an integrated circuit.

10. The data processing system of claim 9, wherein:

the input/output memory management unit provides a first virtual address as a corresponding physical address in response to a first state of the first valid bit without accessing the device table in the system memory; and the input/output memory management unit translates the first virtual address into the corresponding physical address in response to a second state of the first valid bit.

11. The data processing system of claim 9, wherein:

the memory controller stores a plurality of memory access requests, and re-orders the plurality of memory access requests for dispatch to the system memory in response to a plurality of criteria.

12. The data processing system of claim 9, wherein:

the data fabric buffers the memory access requests and selectively switches the memory access requests between selected ones of the plurality of ports.

13. The data processing system of claim 9, wherein:

the input/output memory management unit further comprises a translation look-aside buffer; and the input/output memory management unit uses a translation in the translation look-aside buffer if a valid translation exists for a first virtual address in the translation look- aside buffer.

14. The data processing system of claim 13, wherein:

the input/output memory management unit walks a page table in the system memory if no valid translation exists for the first virtual address in the translation look-aside buffer.

15. The data processing system of claim 14, wherein:

the input/output memory management unit comprises a plurality of page table walkers; and the input/output memory management unit uses the plurality of page table walkers to form a translation of the first virtual address into a first physical address, and subsequently stores the translation in the translation look-aside buffer, wherein multiple ones of the plurality of page table walkers are able to be active at the same time.

16. The data processing system of claim 9, wherein:

the plurality of ports of the data fabric comprises downstream ports;

the first port of the memory controller comprises an upstream port; and the second port of the memory controller comprises a downstream port.

17. A method of input/output device memory management, comprising:

receiving a virtual address from a first input/output device, and in response to receiving the virtual address:

checking a first valid bit corresponding to the first input/output device in a device table entry valid bit array in an input/output memory management unit, wherein the input/output memory management unit is implemented as an integrated circuit;

when the first valid bit has a first state, providing a physical address to a system memory without translating the virtual address; and when the first valid bit has a second state, accessing a device table entry of a device table in the system memory, and translating the virtual address to the physical address according to information in the device table entry.

18. The method of claim 17, further comprising:

storing a plurality of entries corresponding to different input/output devices in the device table, each entry comprising a plurality of fields storing information related to peripheral device transactions; and storing a plurality of valid bits corresponding to different device numbers in the device table entry valid bit array of the input/output memory management unit.

19. The method of claim 17, wherein:

providing the physical address to the system memory without translating the virtual address comprises providing the physical address to a buffer in the system memory.

20. The method of claim 17, further comprising:

switching a memory access request associated with the physical address between an upstream port and a downstream port of a data fabric;

storing the memory access request in a memory controller coupled to the downstream port of the data fabric;

arbitrating among the memory access request and a plurality of other memory access requests by the memory controller; and providing the memory access request to the system memory when the memory access request in response to winning the arbitration.

21. The method of claim 17, wherein translating the virtual address to the physical address according to the information in the device table entry comprises:

using a corresponding translation in a translation look-aside buffer if a valid translation exists for the virtual address in the translation look-aside buffer; and walking a page table in the system memory according to the information in the device table if no valid translation exists for the virtual address in the translation look-aside buffer.

* * * * *